Jan. 18, 1955

J. L. NISBET 2,699,637

PNEUMATIC COTTON GATHERER

Filed Feb. 11, 1952

INVENTOR
John L. Nisbet
BY
ATTORNEY

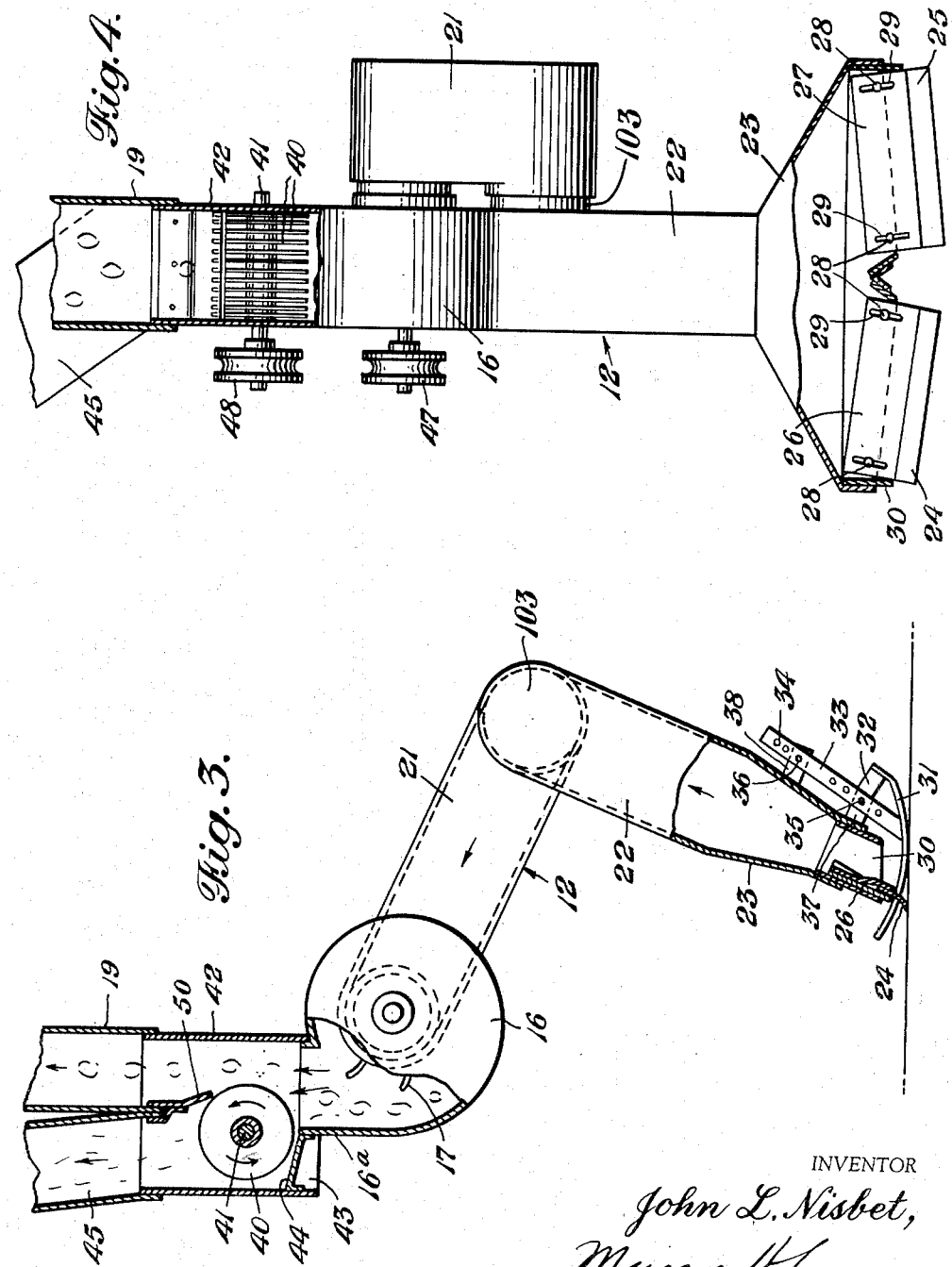

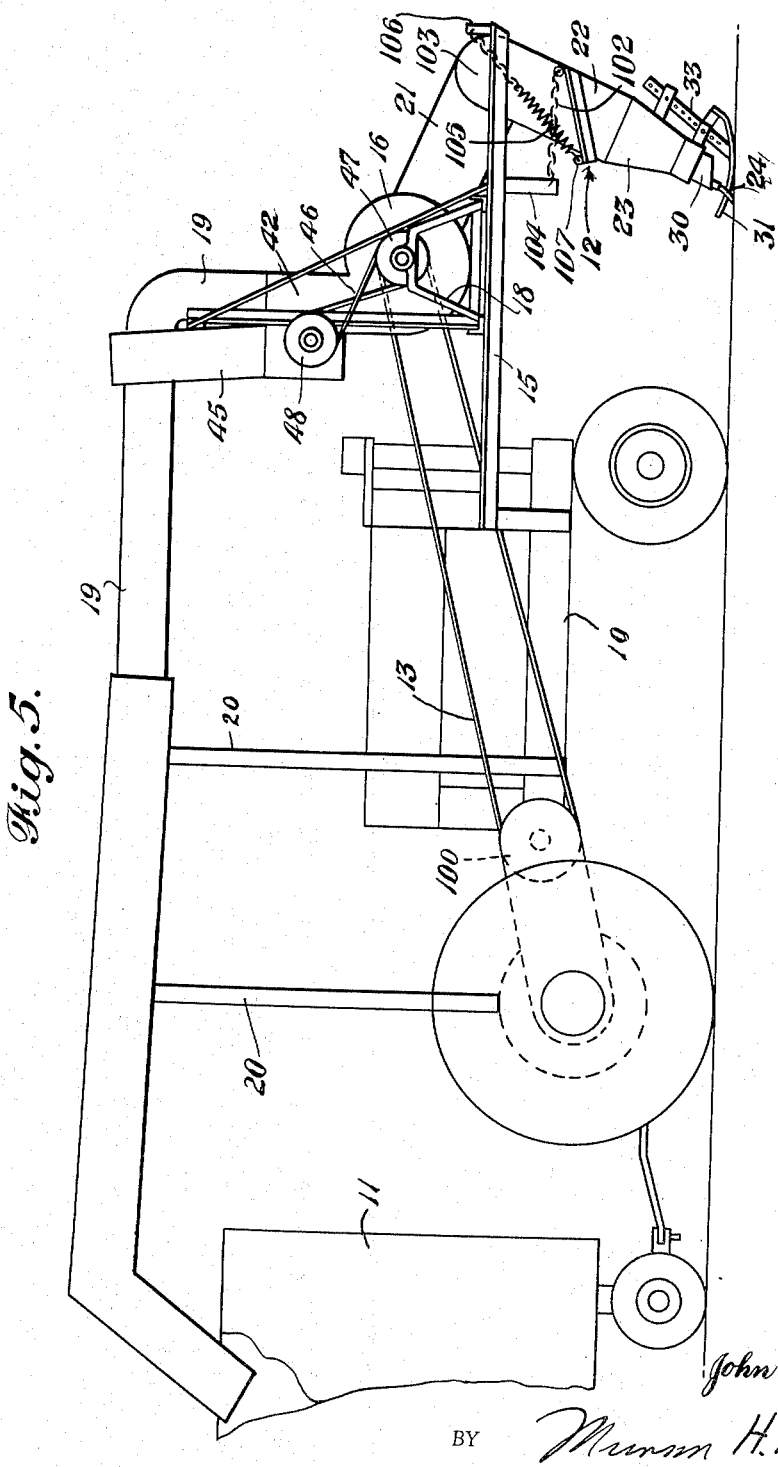

United States Patent Office 2,699,637
Patented Jan. 18, 1955

2,699,637

PNEUMATIC COTTON GATHERER

John L. Nisbet, San Angelo, Tex.

Application February 11, 1952, Serial No. 271,021

12 Claims. (Cl. 56—30)

This invention relates to machines for picking up raw cotton. In every cotton field after the harvest there are thousands of cotton bolls scattered over the ground, due to the weather, especially wind, and also because of the action of most cotton harvesting machines. Because of the high cost of hiring laborers to pick it up, this cotton is usually lost. This loss is of importance, to the nation as well as the farmer, as it amounts to one-tenth to one-fourth of a bale per acre.

The present invention aims to provide a mechanism which will make it possible for one man to pick up in one day practically all the cotton scatterd over the ground in a large field.

More specifically stated, the invention provides a tractor attachment which moves along three rows of cotton plants, picks up the scattered cotton by pneumatic suction, separates the dirt and trash also sucked up, returns the dirt and trash to the field, and conveys the cotton to a trailer or wagon pulled by the tractor.

Other objects are to provide a cotton pick-up mechanism which has flexible and adjustable suction heads or orifices to adapt the machine to the contour of the soil between the rows of cotton plants, and which has flexible and adjustable back lips on the suction heads to drag over the ground and help direct the suction to the front sides of the suction heads to pick up the cotton as it is approached. In combination with the back lips I provide adjustable slide gauges for regulating the spacing of the suction spout or intake pipe above the ground surface.

Further objects are to provide special jointed intake pipes and mountings therefor permitting the suction heads to swing back and up when an obstruction is encountered, thus obviating pulling up roots or sucking up an excessive quantity of soil or possibly a breakage of some part.

Another object is to provide a cotton cleaning or separating mechanism characterized by the employment of a plurality of revolving disks having smooth peripheries and set close together in such a location that the cotton, dirt and trash will encounter the disks and the dirt and trash will pass through the narrow spaces between the disks while the bulkier cotton will be deflected or have its path slightly changed to enter and move through a conduit which conveys it to the trailer.

The invention further provides a tractor attachment which is of simple construction, is easily mounted and dismounted, does not impose a phohibitive load on the tractor, does not require very much power, and with proper attention will give service for many years. The invention has other objects which may be inferred from the following description of a preferred embodiment shown in the accompanying drawings forming a part of this specification.

In said drawings:

Fig. 3 is an enlarged side elevation of the lower part of the attachment with parts broken away and shown in section to show the interior construction;

Fig. 4 is an enlarged front elevation, with parts broken away and shown in section, of a single row attachment; and Fig. 5 is a diagrammatic elevation of the tractor shown with the attachment at its forward end and a trailer hitched to its rear end.

Figures 1, 2:
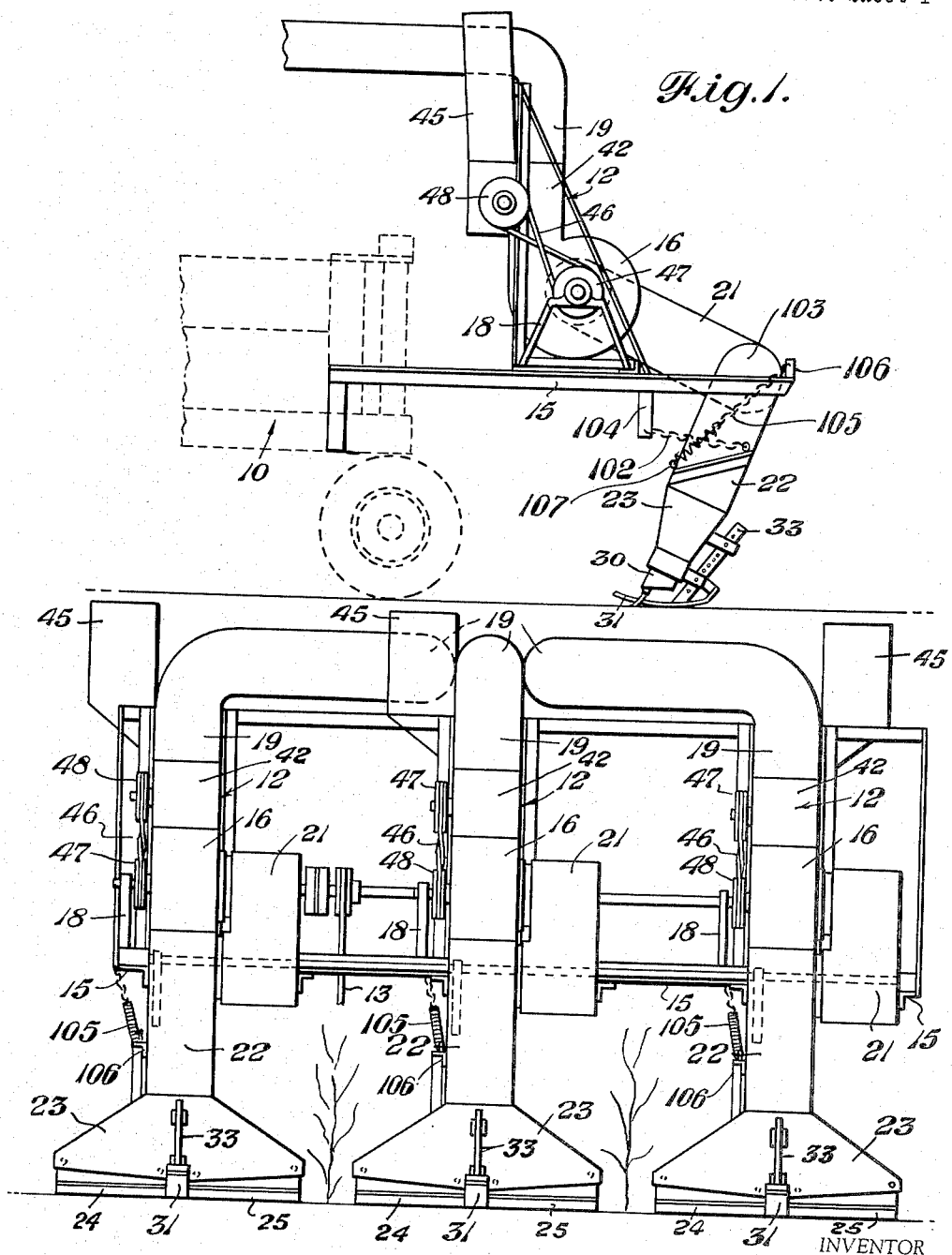
Fig. 1 is a side elevation of the attachment, showing the front part of a tractor in phantom.
Fig. 2 is a front elevation of the attachment per se, shown for three rows of plants.

Referring particularly to the drawings, and first to Fig. 5, the tractor or carrier vehicle 10 is hitched to a trailer 11, or to a wagon having a box body, not shown, and supports at its forward end an attachment 12 which picks up cotton scattered over the ground. This attachment is shown as having suction means comprising fans (to be described) which are driven by a belt 13 in turn driven by a pulley 100 fixed to the power take-off shaft of the tractor. Instead of a tractor attachment, a self-propelled special chassis may be provided for supporting the pick-up mechanism and on such a chassis a box or bin may be mounted to collect the cotton as it is picked up.

Now referring to Figs. 1, 2 and 5, a frame 15 is fixed to the tractor chassis in any desirable way, not shown, and extends forwardly of the tractor in a generally horizontal plane. Preferably frame 15 will be made of angle iron welded at the joints, but it may be formed from other structural shapes; its particular construction and manner of attachment are not considered to be a part of the present invention, hence is not illustrated. Mounted on frame 15 are three independently acting pick-up mechanisms each of which may cover the ground area between two rows of cotton plants. A description of one of these mechanisms will apply to all three. The tractor carried frame 15 provides a traveling support for the parts carried thereby.

Each pick-up mechanism includes a suction fan casing 16 housing a suction fan 17, the fan casing being supported on top of frame 15 by a bearing stand 18 and having a suction discharge conduit or tube 19 and a rigid suction inlet, conduit or duct 21. The discharge tube 19 for conveying away the cotton sucked up by fan 17 extends upwardly from the fan casing and then is bent at right angles and extends backwardly over the tractor to trailer 11. This discharge tube or conveyor may be supported near its rear end by means of upstanding standards 20.

Discharging into the center or intake of the fan casing 16 is the upwardly inclined inlet, duct or conduit 21 whose lower forward end is rigidly supported by the outer end of frame 15 (Fig. 1). Pivotally connected with the lower forward end of duct 21 is a depending rigid duct or conduit 22 on the lower end of which a suction head 23 is mounted, said suction head riding over the surface of the ground as will be described. As shown, duct 22 inclines rearwardly in a downward direction so that its lower end is to the rear of its upper pivoted end and it is able to swing rearwardly and hence rise in the event its suction head encounters an obstruction.

As shown in Figs. 1 and 5 each pivoted conduit is preferably retained in a slightly rearwardly inclined position with the suction head 23 riding on the surface of the ground, this position being maintained by means of a suitable chain 102, one end of which is shown as attached to the conduit 22 at a point substantially below its swivel or pivotal connection 103 with the suction inlet or conduit 21, while the other end of the chain is attached to a suitable fixed bracket 104 carried by the frame member 15. Additional means may also be provided to assist gravity in urging each pivoted conduit downwardly and forwardly, said means being herein shown as a tension spring 105 having one end secured to a bracket member 106 at the front of frame member 15 and its other end attached to the rear of the conduit as at 107. Thus, as the tractor advances the ground contacting portions of the suction head 23 will be urged into engagement with the ground by means of gravity assisted by the springs 105, and will be prevented from passing beyond the desired rearwardly inclined position by means of the limiting chains 102. Limited swinging movement is, however, permitted about the swivel or hinge connection 103 in a vertical plane to take care of various irregularities in the ground surface as the suction heads pass over such surface. In order to conform to the surface of the ground the suction heads are provided with specially designed adjustable ground contacting portions which permit the heads to pass over the slightly V-shaped ground surface between adjacent rows of growing plants. As will be apparent, the swinging movement of the suction heads and pivoted conduits 22 carrying the same will be in substantially vertical planes without lateral swinging movement, which would tend to injure the growing plants in the rows. The preferred construction of the individual suction heads 23 will now be described.

The lower end of duct or conduit 22 is widened in one direction (transversely of the rows) as shown in Fig. 4, and is narrowed in the other direction as Fig. 3 illustrates to provide the previously mentioned suction head. The suction head is divided into two parts or is Y-shaped, and each part carries a flexible back lip 24 or 25 which may be made of heavy rubber or similar material. Each back lip is attached to a plate 26 or 27 having slots 29 through which studs 28 pass, said studs being screwed into the walls of tubular extensions 30 fixed into the lower ends of the Y-shaped suction head. The tubular extensions are so shaped that their lower edges are substantially parallel to a level ground surface, as Fig. 3 shows. As shown, the bottom of each back lip 24 or 25 drags over the surface of the ground, thereby confining the suction to the forward side of the tubular extension. The back lips may be arranged angularly, as shown in Fig. 4, to conform to the slope of the ground lying between two rows of cotton plants. Usually after cultivation of cotton the soil slopes down to a low point half way between two rows, such low point being from one to eight inches lower than the soil adjacent the stems of the plants. The described construction permits the farmer to adjust the suction heads to the conditions in his field.

To support the lower end of the swinging duct 22 upon the ground, a slide gauge is provided including a curved shoe 31 which rests on the ground as shown in Fig. 2 and has a brace 32 extending rearwardly from the forward end thereof, said brace being welded or otherwise secured to the shoe and having its rear end welded or secured to an arm 33 whose lower end is fixed to the top of the shoe. Arm 33 has a plurality of perforations 34 and pins 35, 36 are passed through said perforations and through registering perforations in short arms 32, 38 respectively, said short arms being fixed to and projecting outwardly from the suction head 23 on the forward side. By this construction the farmer may adjust each shoe 31 upwardly or downwardly relative to the lower ends of the tubular extensions 30. It will be noted from Fig. 2 that there is one slide gauge for each Y-shaped suction head and that the slide gauge is midway between the outer ends of the suction head.

With the described machine traveling in the direction of the arrows, Figs. 1 and 3, any cotton on the ground in the path of the suction heads will be lifted by the suction and will travel up through pivoted duct 22 to the fan casing. As the shoes 31 slide over the ground and the back lips 24, 25 likewise are in contact, the soil will be stirred and some dirt and trash will be sucked up into the fan casing along with the cotton. To separate the cotton from the dirt and trash, a novel separator shown in Figs. 3 and 4 is employed. This separator comprises a plurality of power-driven disks 40 having smooth peripheries, these disks being fixed to a common shaft 41 and being so close together that when a cotton boll strikes their peripheries it can not pass between any two of them but moves around them into the discharge tube 19. The spacing of disks 40 may be about three-quarters of an inch or one inch between opposed surfaces. It will be noted that the shaft 41 is to one side of the discharge outlet of the fan casing and preferably it lies in the plane of wall 16ᵃ (Fig. 3) of the fan casing. A housing 42 receives the cotton, dirt and trash discharged by the fan and encloses the rotating disks 40. A clean-out opening 43 is provided in housing 42, with a plug 44 normally closing opening 43 but being manually removable when access to the interior of housing 42 is desired. Housing 42 has about half its discharge side covered by discharge tube 19 and the other half leads into a conduit 45 through which the dirt and trash is discharged onto the ground. It will be understood that the dirt and trash passes between the spaced rotating disks to reach conduit 45. The disks are all rotated synchronously with the fan by means of a crossed belt 46 trained over pulleys 47 and 48. Thus the disks are rotated in an opposite direction from that of the fan, which means that the portions of the disks struck by the cotton are rotated in the same general direction the cotton is traveling. The cotton is thus deflected or has its direction changed but does not have its velocity lowered. A vane or divider 50 (Fig. 3) is fixed inside housing 42 and lies in a plane substantially tangential to the peripheries of the disks with its lower edge practically in contact with said peripheries. This divider precludes passage of any of the cotton around the rotating disks and into conduit 45. The arrangement is such that heavy dirt particles move along the inside of wall 16ᵃ and in a straight path through the spaces between the disks then through housing 42 into conduit 45.

When the described machine moves down a field its three suction heads will straddle two rows of cotton plants and the ground areas on both sides of both rows will be substantially cleared of cotton. Thus with each traverse of the machine across a field in effect three rows are taken care of. If the mechanism travels at average cultivating speed, it will cover thirty to sixty acres in one day, the area covered depending on the length of the working day and the conditions in the field. As will be apparent, the ducts or conduits 22 are mounted for swinging movement in a vertical plane parallel to the direction of movement of the carrier vehicle, which permits the suction heads at the lower ends of such conduits to rise and fall in accordance with irregularities in the ground surface as the carrier vehicle moves through a field of cotton or the like. The construction shown prevents sidewise movement of the conduits 22 and suction heads, which would endanger the plants in the rows straddled by the machine. The flexible rear lips 24 and 25 are adjusted to conform to the shape of the ground between rows of plants.

Obviously many changes and modifications may be made in the described construction as will be apparent to those skilled in the art.

What I claim is:

1. A suction head for picking up cotton scattered over the ground comprising a body in the form of an inverted Y adapted to span the sloping ground between two adjacent rows of cotton plants; a pair of tubular extensions projecting downwardly from the lower ends of the Y-shaped body; a ground-engaging member fixed to the Y-shaped body between the two branches thereof; and a back lip adjustably secured to the rear side of each tubular extension, each lip comprising an elongated strip of flexible material extending downwardly and adapted to yieldingly engage the ground surface so as to confine the suction to the area forward of the back lip.

2. A suction head for picking up cotton scattered over the ground comprising a body in the form of an inverted Y adapted to span the sloping ground between two adjacent rows of cotton plants; a pair of tubular extensions projecting downwardly from the lower ends of the Y-shaped body; a ground-engaging member fixed to the Y-shaped body between the two branches thereof; and a back lip adjustably secured to the rear side of each tubular extension, each lip comprising an elongated strip of flexible material extending downwardly and adapted to yieldingly engage the ground surface so as to confine the suction to the area forward of the back lip, the ground-engaging member comprising a shoe having both ends curved upwardly and adapted to slide over the ground, and means to adjust the position of the shoe relative to the lower end of the tubular extension.

3. An ambulant machine adapted for picking up loose cotton from the ground on opposite sides of a row of growing plants comprising a carrier vehicle, a pair of laterally spaced suction means carried by the vehicle at a position elevated above the ground, each having a cotton receiving inlet and a cotton discharging outlet, a rigid conduit extending downwardly and rearwardly from each inlet, a suction head carried at the lower end of each hinged conduit, and hinge means connecting each rigid conduit at its upper end to the corresponding suction inlet to permit swinging movement of the conduit in a vertical plane only while preventing sidewise movement, the conduit being of sufficient length so that the suction head carried thereby rides on the surface of the ground as the vehicle is moved forwardly, whereby the suction heads are adapted to pick up loose cotton on each side of a row of plants without injury to the plants.

4. An ambulant machine for picking up loose cotton from the surface of the ground between rows of plants comprising a carrier vehicle having a fan supporting member elevated above the surface of the ground, a fan carried by said supporting member having a suction inlet and a discharge outlet, a suction head adapted to pass over the surface of the ground and in contact therewith, and rigid conduit means hingedly connecting the suction head with said suction inlet to permit swinging movement in a vertical plane in the direction of movement of the carrier vehicle while preventing sidewise movement, said suction head being provided with a pair of oppositely inclined ground-engaging lip portions adapted to fit inclined ground portions between a pair of cotton rows, said rigid conduit means being of sufficient length so that the suction head carried thereby slides along the surface of the ground as the carrier vehicle moves forwardly.

5. An ambulant machine for picking up loose cotton from the surface of the ground between rows of plants comprising a carrier vehicle, suction means carried by said vehicle at a position elevated above the ground, and having a suction inlet and a blower outlet, rigid downwardly and rearwardly extending conduit means hingedly connected at its upper end to said suction inlet to permit swinging movement in a vertical plane in a direction parallel to the direction of movement of the carrier vehicle while preventing sidewise movement, and a ground engaging suction head carried by the lower end of said conduit means provided with adjustable lips conforming to the shape of the ground between the rows, said hinged conduit means being of sufficient length so that the suction head carried thereby rides on the surface of the ground.

6. An ambulant machine for picking up loose cotton from the surface of the ground between rows of plants comprising a carrier vehicle, suction means carried by said vehicle at a position elevated above the ground, and having a suction inlet and a blower outlet, rigid downwardly and rearwardly extending conduit means hingedly connected at its upper end to said suction inlet to permit swinging movement in a vertical plane in a direction parallel to the direction of movement of the carrier vehicle while preventing sidewise movement, and a ground engaging suction head carried by the lower end of said conduit means having flexible rear lip portions conforming to the shape of the ground between rows, said conduit means being of sufficient length so that the suction head carried thereby rides on the surface of the ground.

7. An ambulant machine for picking up loose cotton from the surface of the ground between rows of plants comprising a carrier vehicle, suction means carried by said vehicle at a position elevated above the ground, said suction means having a suction inlet and a blower outlet, downwardly and rearwardly extending conduit means hingedly connected at its upper end to said suction inlet to permit swinging movement in a vertical plane in a direction parallel to the direction of movement of the carrier vehicle while preventing sidewise movement, and a ground engaging suction head carried by the lower end of said conduit means comprising a body in the form of an inverted Y adapted to span the sloping ground between two adjacent rows of plants, a pair of tubular extensions projecting downwardly from the lower ends of the Y-shaped body, and a pair of back lip members, one secured to the rear side of each tubular extension.

8. An ambulant machine for picking up loose cotton from the surface of the ground between rows of plants comprising a carrier vehicle, suction means carried by said vehicle at a position elevated above the ground, said suction means having a suction inlet and a blower outlet, downwardly and rearwardly extending conduit means hingedly connected at its upper end to said suction inlet to permit swinging movement in a vertical plane in a direction parallel to the direction of movement of the carrier vehicle while preventing sidewise movement, and a ground engaging suction head carried by the lower end of said conduit means comprising a body in the form of an inverted Y adapted to span the sloping ground between two adjacent rows of plants, a pair of tubular extensions projecting downwardly from the lower ends of the Y-shaped body, a pair of back lip members, one secured to the rear side of each tubular extension, and means for angularly adjusting said lip members to conform to variations in the slope of the ground between rows.

9. For use in connection with a suction fan mounted on a carrier vehicle having a downwardly and rearwardly extending inlet conduit hingedly connected thereto at its upper end to permit swinging movement in a vertical plane parallel to the direction of movement of the carrier vehicle; a ground engaging suction head connected at the lower end of the swinging conduit for picking up cotton scattered over the ground comprising a body in the form of an inverted Y adapted to span the sloping ground between two adjacent rows of cotton plants, a pair of tubular extensions projecting downwardly from the lower ends of the Y-shaped body, and a pair of back lip members, one secured to the rear side of each tubular extension, each lip member comprising an elongated strip of flexible material extending downwardly and adapted to yieldingly engage the ground surface so as to confine the suction to the area forward of the back lip member.

10. For use in connection with a suction fan mounted on a carrier vehicle having a downwardly and rearwardly extending inlet conduit hingedly connected thereto at its upper end to permit swinging movement in a vertical plane parallel to the direction of movement of the carrier vehicle; a ground engaging suction head connected at the lower end of the swinging conduit for picking up cotton scattered over the ground comprising a body in the form of an inverted Y adapted to span the sloping ground between two adjacent rows of cotton plants, a pair of tubular extensions projecting downwardly from the lower ends of the Y-shaped body, a pair of back lip members, one secured to the rear side of each tubular extension, each lip member comprising an elongated strip of flexible material extending downwardly and adapted to yieldingly engage the ground surface so as to confine the suction to the area forward of the back lip member, and means for angularly adjusting said lip members to conform to variations in the slope of the ground between rows.

11. For use in connection with a suction fan mounted on a carrier vehicle having a downwardly and rearwardly extending inlet conduit hingedly connected thereto at its upper end to permit swinging movement in a vertical plane parallel to the direction of movement of the carrier vehicle, a ground-engaging suction head connected at the lower end of the swinging conduit comprising a body in the form of an inverted Y adapted to span the sloping ground between two adjacent rows of cotton plants, a pair of tubular extensions projecting downwardly from the lower ends of the Y-shaped body, a back lip secured to the rear side of each tubular extension, and a ground-engaging member fixed to the Y-shaped body between the two branches thereof comprising a shoe having both ends curved upwardly and adapted to slide over the ground, and means to adjust the position of the shoe relative to the lower end of the tubular extension.

12. For use in connection with a suction fan mounted on a carrier vehicle having a downwardly and rearwardly extending inlet conduit hingedly connected thereto at its upper end to permit swinging movement in a vertical plane parallel to the direction of movement of the carrier vehicle, a ground engaging suction head connected at the lower end of the swinging conduit comprising a body in the form of an inverted Y adapted to span the sloping ground between two adjacent rows of cotton plants, a pair of tubular extensions projecting downwardly from the lower ends of the Y-shaped body, a ground-engaging member fixed to the Y-shaped body between the two branches thereof, and a back lip secured to the rear side of each tubular extension, each lip comprising an elongated strip of flexible material extending downwardly and adapted to yieldingly engage the ground surface so as to confine the suction to the area forward of the back lip, the ground-engaging member comprising a shoe having both ends curved upwardly and adapted to slide over the ground, and means to adjust the position of the shoe relative to the lower end of the tubular extension.

References Cited in the file of this patent

UNITED STATES PATENTS

| Number | Name | Date |
|---|---|---|
| 362,041 | Sailor | Apr. 26, 1887 |
| 442,809 | Hunter | Dec. 16, 1890 |
| 682,816 | Seifert | Sept. 17, 1901 |
| 685,112 | Donnelly | Oct. 22, 1901 |
| 752,790 | Miller | Feb. 23, 1904 |
| 763,389 | Getzlaff | June 28, 1904 |
| 781,550 | Prinz | Jan. 31, 1905 |
| 796,207 | Harbour | Aug. 1, 1905 |
| 830,102 | Richmond | Sept. 4, 1906 |
| 946,454 | Mays | Jan. 11, 1910 |
| 1,067,802 | Dana | July 22, 1913 |
| 1,078,352 | Hervey | Nov. 11, 1913 |
| 1,090,606 | Epps | Mar. 17, 1914 |
| 1,107,083 | Lovejoy | Aug. 11, 1914 |
| 1,149,253 | Dickerson | Aug. 10, 1915 |
| 1,331,710 | Isom | Feb. 24, 1920 |

(Other references on following page)

UNITED STATES PATENTS

| Number | Name | Date |
|---|---|---|
| 1,332,425 | Cassel | Mar. 2, 1920 |
| 1,371,468 | Burges | Mar. 15, 1921 |
| 1,474,627 | Garrett | Nov. 20, 1923 |
| 1,485,252 | Denis | Feb. 26, 1924 |
| 1,529,846 | Oberle | Mar. 17, 1925 |
| 2,046,932 | Wyatt et al. | July 7, 1936 |
| 2,361,909 | Bernal | Nov. 7, 1944 |
| 2,458,258 | Furr | Jan. 4, 1949 |
| 2,471,314 | Curtis | May 24, 1949 |
| 2,492,495 | Nelson | Dec. 27, 1949 |
| 2,493,422 | Sartin | Jan. 3, 1950 |
| 2,502,810 | Waters | Apr. 4, 1950 |
| 2,538,643 | Gregory | Jan. 16, 1951 |
| 2,576,381 | Wright | Nov. 27, 1951 |
| 2,590,734 | Strong | Mar. 25, 1952 |
| 2,667,025 | Conner | Jan. 26, 1954 |

FOREIGN PATENTS

| Number | Country | Date |
|---|---|---|
| 22,035 | Norway | Feb. 19, 1912 |
| 7,420 | Australia | June 18, 1928 |
| 133,119 | Switzerland | Aug. 1, 1929 |